United States Patent
Eronen et al.

(10) Patent No.: US 11,221,821 B2
(45) Date of Patent: Jan. 11, 2022

(54) AUDIO SCENE PROCESSING

(71) Applicant: Nokia Technologies Oy, Espoo (FI)

(72) Inventors: Antti Eronen, Tampere (FI); Jussi Artturi Leppanen, Tampere (FI); Sujeet Shyamsundar Mate, Tampere (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/957,805

(22) PCT Filed: Dec. 3, 2018

(86) PCT No.: PCT/IB2018/059588
§ 371 (c)(1),
(2) Date: Jun. 25, 2020

(87) PCT Pub. No.: WO2019/130133
PCT Pub. Date: Jul. 4, 2019

(65) Prior Publication Data
US 2020/0401364 A1  Dec. 24, 2020

(30) Foreign Application Priority Data

Dec. 27, 2017  (EP) .................................... 17210625

(51) Int. Cl.
*G06F 3/16*  (2006.01)
*H04R 5/04*  (2006.01)
*H04S 7/00*  (2006.01)

(52) U.S. Cl.
CPC .............. *G06F 3/165* (2013.01); *H04R 5/04* (2013.01); *H04S 7/302* (2013.01)

(58) Field of Classification Search
CPC ............ G06F 3/165; H04R 5/04; H04S 7/302
See application file for complete search history.

(56) References Cited

U.S. PATENT DOCUMENTS

| 8,825,187 B1 | 9/2014 | Hamrick et al. ................ 700/94 |
| 2010/0040238 A1 | 2/2010 | Jang et al. ...................... 381/17 |
| 2018/0150275 A1* | 5/2018 | Mate ....................... H04S 7/304 |

FOREIGN PATENT DOCUMENTS

WO   WO 2017/178309 A1   10/2017

* cited by examiner

*Primary Examiner* — David L Ton
(74) *Attorney, Agent, or Firm* — Harrington & Smith (57) ABSTRACT

From multiple audio objects in an audio scene, one or more audio objects of interest are identified. First audio signals associated with the plurality of objects are processed for provision to a user device. The processing may be based on a position of the user device in an audio scene. The processing may include combining the first audio signals associated with the audio objects to form combined first audio signals, modifying the amplitude of the combined first audio signals and limiting to a first level the maximum amplitude of the combined first audio signals. The processing also includes modifying the amplitude of one or more individual first audio signals, associated with the one or more audio objects of interest, the modifying the amplitude of one or more individual first audio signals being independent of that for the combined first audio signals.

20 Claims, 7 Drawing Sheets

AUDIO SCENE PROCESSING

CROSS REFERENCE TO RELATED APPLICATION

This patent application is a U.S. National Stage application of International Patent Application Number PCT/IB2018/059588 filed Dec. 3, 2018, which is hereby incorporated by reference in its entirety, and claims priority to EP 17210625.4 filed Dec. 27, 2017, which is also hereby incorporated by reference in its entirety.

FIELD

This disclosure relates to methods and systems for audio scene processing, particularly, though not exclusively, for virtual reality (VR) and augmented reality (AR) content which comprises spatial audio from one or more audio objects.

BACKGROUND

Virtual reality (VR) is a rapidly developing area of technology in which one or both of video and audio content is provided to a user device. The user device may be provided with a live or stored feed from a content source, the feed representing a virtual reality space or world for immersive output through the user device. Where audio is provided, the audio which may be spatial audio representing captured or composed audio from multiple audio objects. A virtual space or virtual world is any computer-generated version of a space, for example a captured real world space, in which a user can be immersed through a user device such as a virtual reality headset. The virtual reality headset may be configured to provide one or more of virtual reality video and spatial audio content to the user, e.g. through the use of a pair of video screens and headphones incorporated within the headset.

Position and/or movement of the user device can enhance the immersive experience. Some virtual reality user devices use so-called three degrees of freedom (3DoF) which means that the head movement in the yaw, pitch and roll axes are measured and determine what the user sees and hears. This facilitates the scene remaining largely static in a single location as the user rotates their head. A next stage may be referred to as 3DoF+ which may facilitate limited translational movement in Euclidean space in the range of, e.g. tens of centimetres, around a location. A yet further stage is a six degrees-of-freedom (6DoF) system, where the user is able to freely move in the Euclidean space and rotate their head in the yaw, pitch and roll axes. Six degrees-of-freedom systems and methods will enable the provision and consumption of volumetric virtual reality content.

Volumetric virtual reality content comprises data representing spaces and/or objects in three-dimensions from all angles, enabling the user to move fully around the spaces and/or objects to view and/or hear them from any angle.

For the avoidance of doubt, references to virtual reality (VR) are also intended to cover related technologies such as augmented reality (AR.)

SUMMARY

A first aspect provides an apparatus comprising: means for identifying, from a plurality of audio objects in an audio scene, one or more audio objects of interest; means for processing first audio signals associated with the plurality of objects for provision to a user device, by: combining first audio signals associated with at least some of the audio objects to form combined first audio signals; modifying the amplitude of the combined first audio signals and limiting to a first level the maximum amplitude of the combined first audio signals; and modifying the amplitude of one or more individual first audio signals, associated with the one or more audio objects of interest, said modifying being independent of that for the combined first audio signals.

The apparatus may further comprise means subsequently for combining the combined first audio signals, subjected to the first level limiting, with the one or more individual first audio signals and providing the resultant signal to the user device.

The processing means, in a first processing path, may apply first dynamic range compression to the combined first audio signals; and in a second processing path, may apply individual second dynamic range compression to the one or more individual first audio signals respectively associated with the one or more objects of interest.

The processing means may further perform: amplification in the first processing path to the first audio signals prior to combining; and amplification in the second processing path after applying individual second dynamic range compression to the one or more individual first audio signals, the amplification being based on the distance of the user device from the one or more audio objects of interest.

The amplification may be determined by the inverse distance of the user device from the one or more audio objects of interest.

A plurality of objects of interest may be identified by the identifying means and wherein the second dynamic range compression individually applied to each individual first audio signal by the processing means may have different dynamic range compression characteristics.

The processing means may be configured such that the proportion of one or more first audio signals respectively associated with the one or more objects of interest is (i) decreased prior to combining and applying first dynamic range compression and (ii) simultaneously increased prior to applying individual second dynamic range compression to said one or more signals.

The processing means may be configured such that the combined first audio signals only comprise first audio signals associated with audio objects other than the one or more audio objects of interest.

The processing means may combine the audio signals by summing.

The one or more objects of interest may be identified based on distance from the user device.

The one or more objects of interest may be identified based on direction of movement of the user device relative to the objects.

The audio objects may comprise virtual objects in a volumetric virtual scene.

The individual first audio signals may be limited to a second maximum amplitude level, different from the first, and the difference between the first and second maximum amplitude levels may adjust dynamically based on the position of the user device in the audio scene.

Another aspect provides a method comprising: identifying, from a plurality of audio objects in an audio scene, one or more audio objects of interest; processing first audio signals associated with the plurality of objects for provision to a user device, comprising: combining the first audio signals associated with the audio objects to form combined first audio signals; modifying the amplitude of the combined first audio signals and limiting to a first level the maximum amplitude of the combined first audio signals; and modifying the amplitude of one or more individual first audio signals, associated with the one or more audio objects of interest, said modifying being independent of that for the combined first audio signals.

Another aspect provides a computer readable medium comprising computer program code stored thereon, the computer readable medium and computer program code being configured to, when run on at least one processor: to identify, from a plurality of audio objects in an audio scene, one or more audio objects of interest; to process first audio signals associated with the plurality of objects for provision to a user device, comprising: combining the first audio signals associated with the audio objects to form combined first audio signals; modifying the amplitude of the combined first audio signals and limiting to a first level the maximum amplitude of the combined first audio signals; and modifying the amplitude of one or more individual first audio signals, associated with the one or more audio objects of interest, said modifying being independent of that for the combined first audio signals.

Another aspect provides an apparatus, the apparatus having at least one processor and at least one memory having computer-readable code stored thereon which when executed controls the at least one processor: to identify, from a plurality of audio objects in an audio scene, one or more audio objects of interest; to process first audio signals associated with the plurality of objects for provision to a user device, comprising: combining the first audio signals associated with the audio objects to form combined first audio signals; modifying the amplitude of the combined first audio signals and limiting to a first level the maximum amplitude of the combined first audio signals; and modifying the amplitude of one or more individual first audio signals, associated with the one or more audio objects of interest, said modifying being independent of that for the combined first audio signals.

Another aspect provides a non-transitory computer-readable medium having stored thereon computer-readable code, which, when executed by at least one processor, causes the at least one processor to perform a method, comprising: identifying, from a plurality of audio objects in an audio scene, one or more audio objects of interest; processing first audio signals associated with the plurality of objects for provision to a user device, comprising: combining the first audio signals associated with the audio objects to form combined first audio signals; modifying the amplitude of the combined first audio signals and limiting to a first level the maximum amplitude of the combined first audio signals; and modifying the amplitude of one or more individual first audio signals, associated with the one or more audio objects of interest, said modifying being independent of that for the combined first audio signals.

BRIEF DESCRIPTION OF THE DRAWINGS

Embodiments will now be described by way of non-limiting example, with reference to the accompanying drawings, in which.

DETAILED DESCRIPTION OF PREFERRED EMBODIMENTS

In the description and drawings, like reference numerals refer to like elements throughout.

In overview, embodiments relate generally to audio processing of audio signals from a plurality of objects in an audio scene, for example a virtual reality (VR) audio scene or an augmented reality (AR) audio scene, although the methods and systems described herein are not limited to such. The audio scene may be accompanied by a video scene comprising visuals of objects in a visual virtual world, but this is not essential. The user, usually wearing or carrying a user device such as a virtual reality headset having one or more display screens and earphones, may explore the audio and/or video scene by moving, which exploration may be in six degrees-of-freedom where the user is able to freely move in the Euclidean space and rotate their head in the yaw, pitch and roll axes.

Embodiments particularly relate to audio processing methods and systems whereby one or more objects of interest are identified, and audio signals deriving from these objects of interest are processed differently from those from other objects. The audio signals may be provided directly from microphones or pickups carried by the audio objects, or may be extracted from a composite audio signal which may be produced by a spatial capture apparatus, or a combination of both.

For example, a user wearing or carrying a user device such as a Virtual Reality (VR) headset may explore the scene in such a way that they get closer to, or farther from, one or more sound objects, e.g. an object that is producing sound, such as a singer or a musical instrument. The user's position over time, and hence movement, may be determined by any suitable position determination technique to be described below. To provide a sense of realism, the sound from such an object should get louder (higher in amplitude) as the user approaches it, and quieter (lower in amplitude) as the user moves away from it. A maximum amplitude level is usually set for such audio signals to avoid disturbing or overwhelming the user, but has the drawback in that if this level is already reached before the user gets very close to a particular object, the amplitude will not increase any further. This detracts from the sense of realism. One way of avoiding this problem is to reduce the amplitude of other, background sounds in order that the amplitude of the approached object's sound is relatively increased. However, in a complex audio scene, or where the user moves back and forth relative to an object, there will be a continuous change in the level of background sounds which may be disturbing and/or detract from realism.

Embodiments herein offer an improvement.

Figure 1:
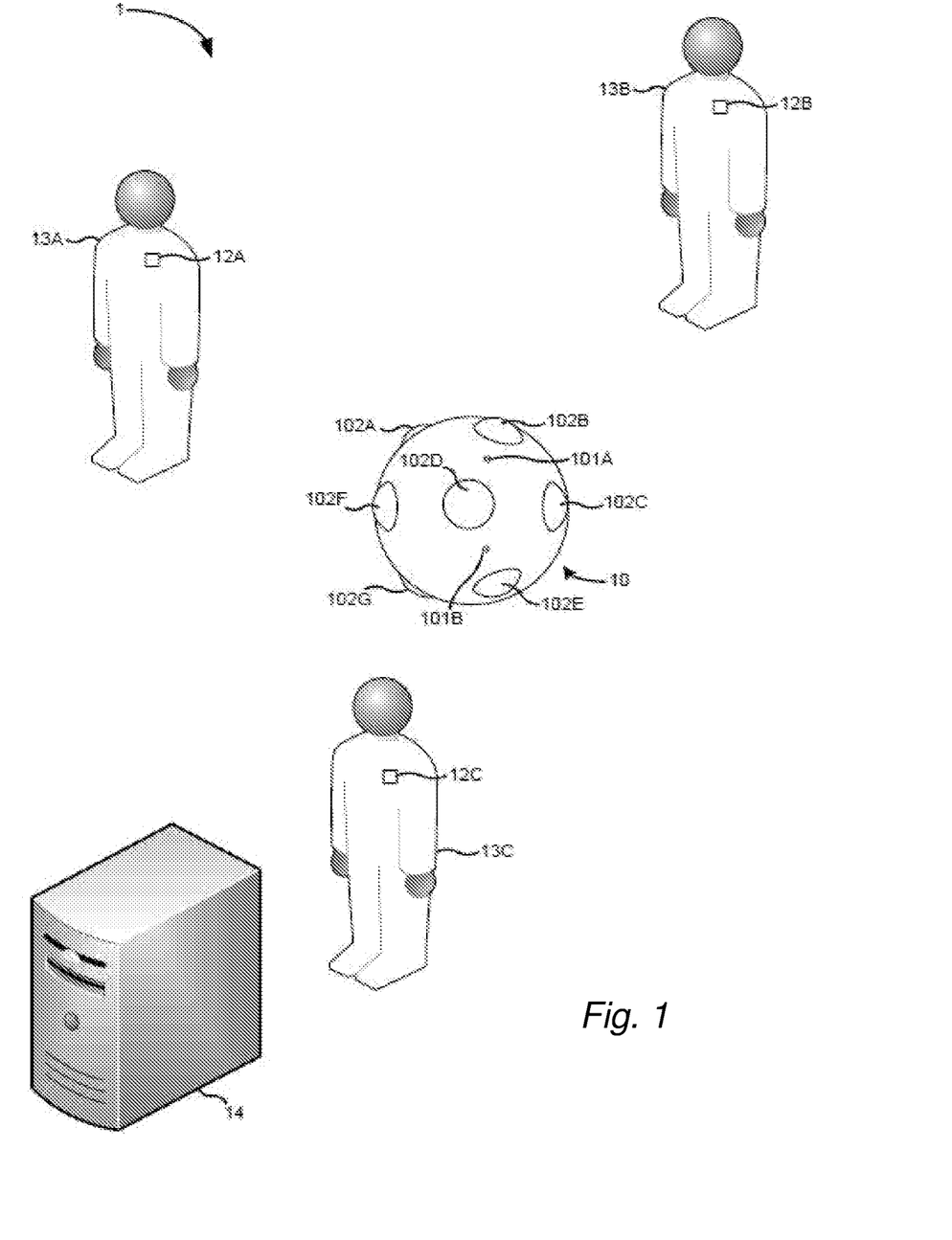
FIG. 1 is an example of an audio capture system which may be used in order to capture audio signals for processing in accordance with various examples described herein.

FIG. 1 is an example of an audio capture system 1 which may be used in order to capture audio signals for processing in accordance with various examples described herein. In this example, the system 1 comprises a spatial audio capture apparatus 10 configured to capture a spatial audio signal, and one or more additional audio capture devices 12A, 12B, 12C.

The spatial audio capture apparatus 10 comprises a plurality of audio capture devices 101A, B (e.g. directional or non-directional microphones) which are arranged to capture audio signals which may subsequently be spatially rendered into an audio stream in such a way that the reproduced sound is perceived by a listener as originating from at least one virtual spatial position. Typically, the sound captured by the spatial audio capture apparatus 10 is derived from plural different audio objects which may be at one or more different locations relative to the spatial audio capture apparatus 10. As the captured spatial audio signal includes components derived from plural different sounds sources, it may be referred to as a composite audio signal. Although only two audio capture devices 101A, B are visible in FIG. 1, the spatial audio capture apparatus 10 may comprise more than two devices 101A, B. For instance, in some specific examples, the audio capture apparatus 10 may comprise eight audio capture devices.

In the example of FIG. 1, the spatial audio capture apparatus 10 is also configured to capture visual content (e.g. video) by way of a plurality of visual content capture devices 102A-G (e.g. cameras). The plurality of visual content capture devices 102A-G of the spatial audio capture apparatus 10 may be configured to capture visual content from various different directions around the apparatus, thereby to provide immersive (or virtual reality content) for consumption by users. In the example of FIG. 1, the spatial audio capture apparatus 10 is a presence-capture device, such as Nokia's OZO camera. However, as will be appreciated, the spatial audio capture apparatus 10 may be another type of device and/or may be made up of plural physically separate devices. For example, the spatial audio capture apparatus 10 may record only audio and not video. As will also be appreciated, although the content captured may be suitable for provision as immersive content, it may also be provided in a regular non-VR format for instance via a smart phone or tablet computer.

As mentioned previously, in the example of FIG. 1, the spatial audio capture system 1 further comprises one or more additional audio capture devices 12A-C. Each of the additional audio capture devices 12A-C may comprise at least one microphone and, in the example of FIG. 1, the additional audio capture devices 12A-C are lavalier microphones configured for capture of audio signals derived from an associated user 13A-C. The users 13A-C represent sound or audio objects in this context in that they produce sound. For instance, in FIG. 1, each of the additional audio capture devices 12A-C is associated with a different user by being affixed to the user in some way. However, it will be appreciated that, in other examples, the additional audio capture devices 12A-C may take a different form and/or may be located at fixed, predetermined locations within an audio capture environment.

The locations of the additional audio capture devices 12A-C and/or the spatial audio capture apparatus 10 within the audio capture environment may be known by, or may be determinable by, the audio capture system 1 (for instance, the audio processing apparatus 14). For instance, in the case of mobile audio capture apparatuses, the apparatuses may include location determination component for enabling the location of the apparatuses to be determined. In some specific examples, a radio frequency location determination system such as High Accuracy Indoor Positioning may be employed, whereby the additional audio capture devices 12A-C (and in some examples the spatial audio capture apparatus 10) transmit messages for enabling a location server to determine the location of the additional audio capture devices within the audio capture environment. In other examples, for instance when the additional audio capture devices 12A-C are static, the locations may be pre-stored by an entity which forms part of the audio capture system 1 (for instance, audio processing apparatus 14).

In the example of FIG. 1, the audio capture system 1 further comprises audio processing apparatus 14. The audio processing apparatus 14 is configured to receive and store signals captured by the spatial audio capture apparatus 10 and the one or more additional audio capture devices 12A-C. The signals may be received at the audio processing apparatus 14 in real-time during capture of the audio signals or may be received subsequently for instance via an intermediary storage device. In such examples, the audio processing apparatus 14 may be local to the audio capture environment or may be geographically remote from the audio capture environment in which the audio capture apparatus 10 and devices 12A-C are provided. In some examples, the audio processing apparatus 14 may even form part of the spatial audio capture apparatus 10.

The audio signals received by the audio signal processing apparatus 14 may comprise a multichannel audio input in a loudspeaker format. Such formats may include, but are not limited to, a stereo signal format, a 4.0 signal format, 5.1 signal format and a 7.1 signal format. In such examples, the signals captured by the system of FIG. 1 may have been pre-processed from their original raw format into the loudspeaker format. Alternatively, in other examples, audio signals received by the audio processing apparatus 14 may be in a multi-microphone signal format, such as a raw eight channel input signal. The raw multi-microphone signals may, in some examples, be pre-processed by the audio processing apparatus 14 using spatial audio processing techniques thereby to convert the received signals to loudspeaker format or binaural format.

In some examples, the audio processing apparatus 14 may be configured to mix the signals derived from the one or more additional audio capture devices 12A-C with the signals derived from the spatial audio capture apparatus 10. For instance, the locations of the additional audio capture devices 12A-C may be utilized to mix the signals derived from the additional audio capture devices 12A-C to the correct spatial positions within the spatial audio derived from the spatial audio capture apparatus 10. The mixing of the signals by the audio processing apparatus 14 may be partially or fully-automated.

The audio processing apparatus 14 may be further configured to perform (or allow performance of) spatial repositioning within the spatial audio captured by the spatial audio capture apparatus 10 of the audio objects captured by the additional audio capture devices 12A-C.

Spatial repositioning of audio objects may be performed to enable future rendering in three-dimensional space with free-viewpoint audio in which a user may choose a new listening position freely. Also, spatial repositioning may be used to separate audio objects thereby to make them more individually distinct. Similarly, spatial repositioning may be used to emphasize/de-emphasize certain sources in an audio mix by modifying their spatial position. Other uses of spatial repositioning may include, but are certainly not limited to, placing certain audio objects to a desired spatial location, thereby to get the listeners attention (these may be referred to as audio cues), limiting movement of audio objects to match a certain threshold, and widening the mixed audio signal by widening the spatial locations of the various audio objects. Various techniques for performance of spatial repositioning are known in the art and so will not be in detail herein.

Figure 2:
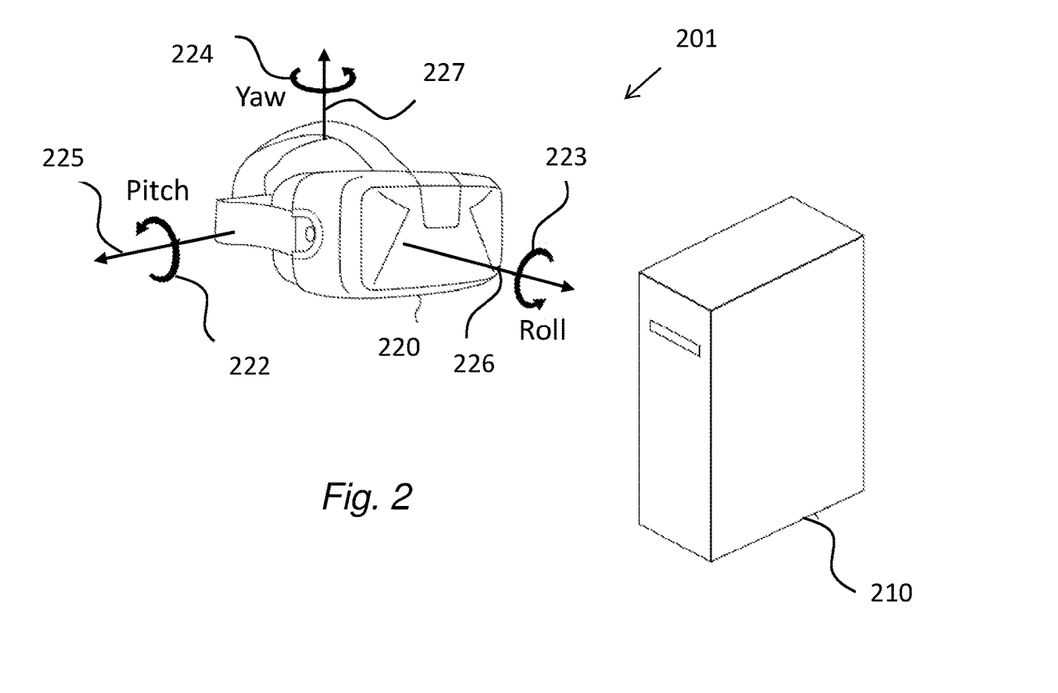
FIG. 2 is a perspective view of a virtual reality display system, in accordance with example embodiments.

FIG. 2 is a schematic illustration of a virtual reality display system 201 which represents user-end equipment. The virtual reality system 201 includes a user device in the form of a virtual reality headset 220, for displaying visual data for a virtual reality space, and a virtual reality media player 210 for rendering visual data on the virtual reality headset 220. In some example embodiments, a separate user control (not shown) may be associated with the virtual reality display system 1, e.g. a hand-held controller.

In the context of this specification, a virtual space or world is any computer-generated version of a space, for example a captured real world space, in which a user can be immersed. In some example embodiments, the virtual space may be entirely computer-generated, i.e. not captured and received from the FIG. 1 spatial audio capture apparatus. The virtual reality headset 220 may be of any suitable type. The virtual reality headset 220 may be configured to provide virtual reality video and/or audio content data to a user. As such, the user may be immersed in virtual space.

The virtual reality headset 220 receives the virtual reality content data from a virtual reality media player 210. The virtual reality media player 210 may be part of a separate device which is connected to the virtual reality headset 220 by a wired or wireless connection. For example, the virtual reality media player 210 may include a games console, or a PC configured to communicate visual data to the virtual reality headset 220.

Alternatively, the virtual reality media player 210 may form part of the virtual reality headset 220.

Here, the virtual reality media player 210 may comprise a mobile phone, smartphone or tablet computer configured to play content through its display. For example, the virtual reality media player 210 may be a touchscreen device having a large display over a major surface of the device, through which video content can be displayed. The virtual reality media player 210 may be inserted into a holder of a virtual reality headset 220. With such virtual reality headsets 220, a smart phone or tablet computer may display visual data which is provided to a user's eyes via respective lenses in the virtual reality headset 220. The virtual reality display system 1 may also include hardware configured to convert the device to operate as part of virtual reality display system 201. Alternatively, the virtual reality media player 210 may be integrated into the virtual reality headset 220. The virtual reality media player 210 may be implemented in software.

In some example embodiments, a device comprising virtual reality media player software is referred to as the virtual reality media player 210.

The virtual reality display system 201 may include means for determining the spatial position of the user and/or orientation of the user's head. This may be by means of determining the spatial position and/or orientation of the virtual reality headset 220. Over successive time frames, a measure of movement may therefore be calculated and stored. Such means may comprise part of the virtual reality media player 210. Alternatively, the means may comprise part of the virtual reality headset 220. For example, the virtual reality headset 20 may incorporate motion tracking sensors which may include one or more of gyroscopes, accelerometers and structured light systems. These sensors generate position data from which a current visual field-of-view (FOV) is determined and updated as the user, and so the virtual reality headset 220, changes position and/or orientation. The virtual reality headset 220 may comprise two digital screens for displaying stereoscopic video images of the virtual world in front of respective eyes of the user, and also two headphones, earphone or speakers for delivering audio. The example embodiments herein are not limited to a particular type of virtual reality headset 220.

In some example embodiments, the virtual reality display system 201 may determine the spatial position and/or orientation of the user's head using the above-mentioned six degrees-of-freedom method. As shown in FIG. 1, these include measurements of pitch 222, roll 223 and yaw 224 and also translational movement in Euclidean space along side-to-side, front-to-back and up-and-down axes 225, 226, 227.

The virtual reality display system 201 may be configured to display virtual reality content data to the virtual reality headset 220 based on spatial position and/or the orientation of the virtual reality headset. A detected change in spatial position and/or orientation, i.e. a form of movement, may result in a corresponding change in the visual and/or audio data to reflect a position or orientation transformation of the user with reference to the space into which the visual data is projected. This allows virtual reality content data to be consumed with the user experiencing a 3D virtual reality environment.

In the context of volumetric virtual reality spaces or worlds, this means that the user's position can be detected relative to content provided within the volumetric virtual reality content, e.g. so that the user can move freely within a given virtual reality space or world, around individual objects or groups of objects, and can view and/or listen to the objects from different angles depending on the rotation of their head. In example embodiments to be described later on, the user may also view and explore a plurality of different virtual reality spaces or worlds and move from one virtual reality space or world to another one.

Audio data may be provided to headphones provided as part of the virtual reality headset 220. The audio data may represent spatial audio source content and/or may represent signals from the additional audio capture devices 12A-C shown in FIG. 1. Spatial audio may refer to directional rendering of audio in the virtual reality space or world such that a detected change in the user's spatial position or in the orientation of their head may result in a corresponding change in the spatial audio rendering to reflect a transformation with reference to the space in which the spatial audio data is rendered.

The angular extent of the environment observable or hearable through the virtual reality headset 220 is called the visual or audible field of view (FOV). The actual FOV observed by a user in terms of visuals depends on the inter-pupillary distance and on the distance between the lenses of the virtual reality headset 220 and the user's eyes, but the FOV can be considered to be approximately the same for all users of a given display device when the virtual reality headset is being worn by the user.

Figure 3:
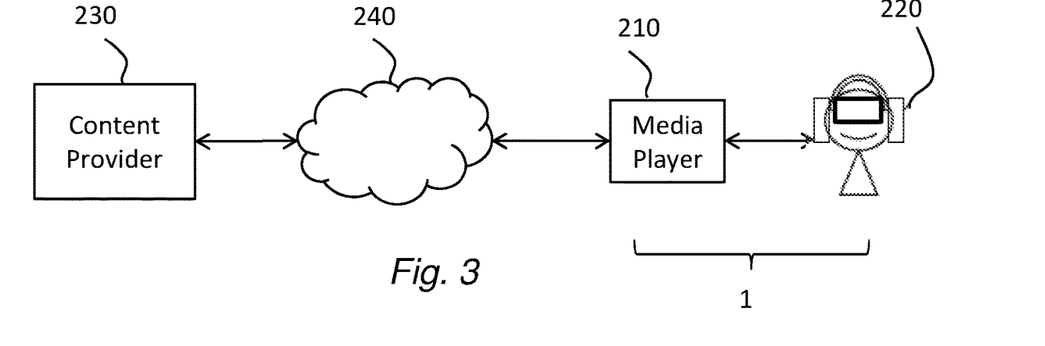
FIG. 3 is a block diagram of a computer network including the FIG. 2 virtual reality display system, in accordance with example embodiments.

Referring to FIG. 3, a remote content provider 230, which may be the audio processing apparatus 14 shown in FIG. 1, may store and transmit streaming virtual reality content data which, in the context of example embodiments, is volumetric virtual reality content data for output to the virtual reality headset 220. Responsive to receive or download requests sent by the virtual reality media player 210, the content provider 230 streams the virtual reality data over a data network 240, which may be any network, for example an IP network such as the Internet.

The remote content provider 230 may or may not be the location or system where the virtual reality video is captured, created and/or processed.

For illustration purposes, we may assume that the content provider 230 also captures, encodes and stores the virtual reality content, as well as streaming it responsive to signals from the virtual reality display system 201.

Figure 4:
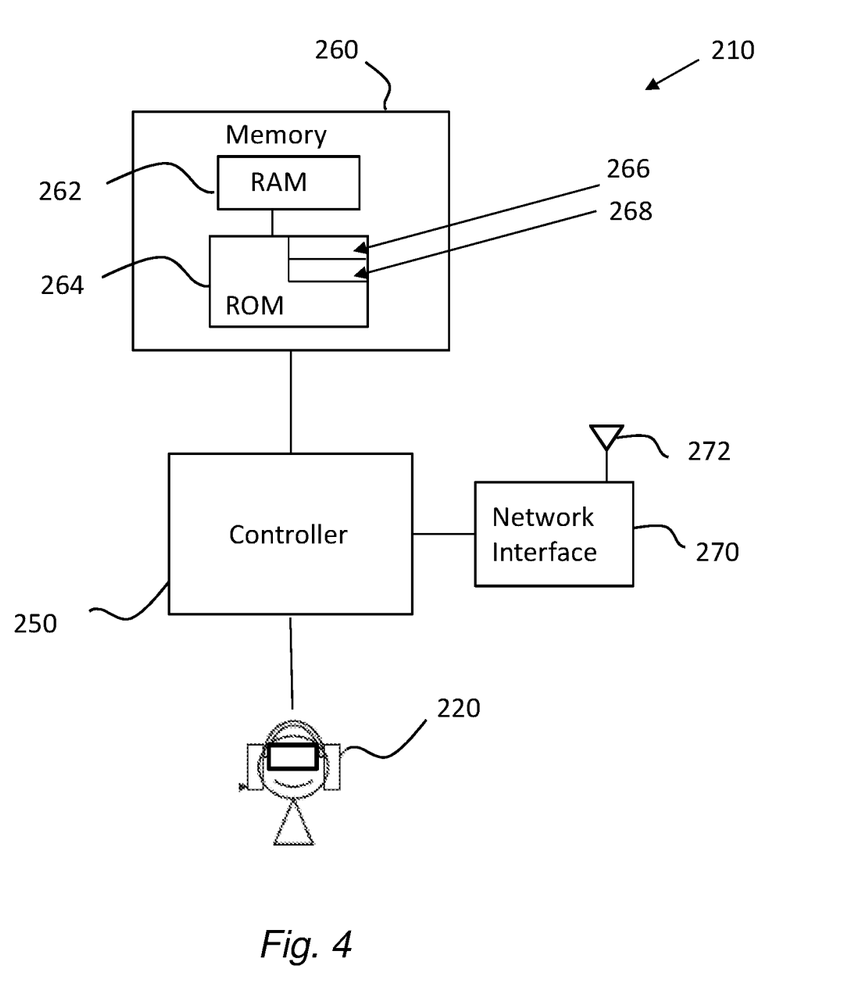
FIG. 4 is a schematic view of components of a media player forming part of the FIG. 2 virtual reality display system, in accordance with example embodiments.

FIG. 4 is a schematic diagram of components of the virtual reality media player 210. This assumes that embodiments herein are processed within the virtual reality media player 210 but it should be appreciated that embodiments may be processed within the virtual reality headset 220, in which case corresponding components will be present.

The virtual reality media player 210 may have a controller 250, a memory 260 closely coupled to the controller and comprised of a RAM 262 and ROM 264 and a network interface 270. It may additionally, but not necessarily, comprise a display and hardware keys. The controller 250 is connected to each of the other components in order to control operation thereof.

The network interface 270 may be configured for connection to the network 240, e.g. a modem which may be wired or wireless. An antenna 272 is shown for wireless connection, which may use WiFi and/or Bluetooth, for example. Data regarding the position of the virtual reality headset 220 may be received by means of the network interface 270 and video and/or audio data may be transmitted to the virtual reality headset 220 by means of this network interface.

The memory 260 may comprise a hard disk drive (HDD) or a solid state drive (SSD). The ROM 264 of the memory 260 stores, amongst other things, an operating system 266 and may store one or more software applications 268. The RAM 262 is used by the controller 250 for the temporary storage of data. The operating system 266 may contain code which, when executed by the controller 250 in conjunction with the RAM 262, controls operation of each of the hardware components.

The controller 250 may take any suitable form. For instance, it may be a microcontroller, plural microcontrollers, a processor, or plural processors.

In some example embodiments, the virtual reality media player 210 may also be associated with external software applications. These may be applications stored on a remote server device and may run partly or exclusively on the remote server device. These applications may be termed cloud-hosted applications or data. The virtual reality media player 210 may be in communication with the remote server device in order to utilize the software application stored there.

Embodiments herein will now be described in greater detail with reference to examples. The processing operations to be described below may be performed by a software application 268 provided on the memory 260 is for controlling how audio is processed based on one or more objects of interest to the user wearing the virtual reality headset 220. As already mentioned, such a software application 268 may alternatively be provided in the virtual reality headset 220 itself, or any other form of user device appropriate for processing audio.

Figure 5:
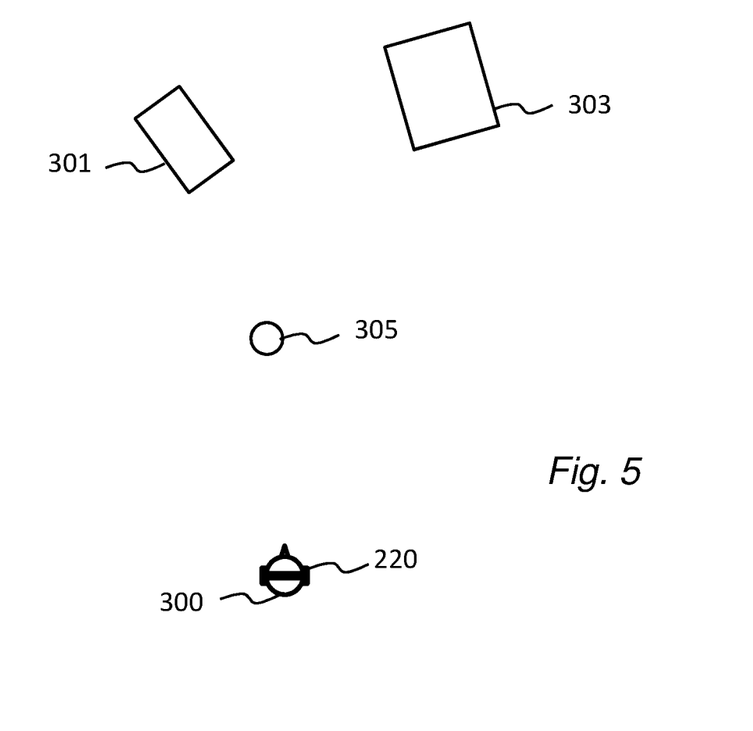
FIG. 5 is a top plan view of an example audio scene comprising a plurality of audio objects, shown in relation to a user carrying a virtual reality headset.

FIG. 5 shows an example virtual world scenario shown in top plan view, the virtual world comprising by way of example three audio objects 301, 303, 305. Each audio object 301, 303, 305 may be any form of captured or generated audio object. In this example, a first audio object 301 may represent a first vehicle which emits engine noise, a second audio object 303 may represent a second vehicle which emits a different engine noise, and a third audio object 305 may represent a person that is speaking or singing. For convenience, the position of a user 300 wearing the above virtual reality headset 220 is also shown in relation to the first to third audio objects 301, 303, 305.

In operation, the audio signals from each of the first to third audio objects 301, 303, 305, in digital form, will be rendered to the headphones of the virtual reality headset 220 based on user position. So, the audio signal from the third audio object 305 may be more prominent, for example rendered with higher gain, than the other audio signals from the first and second audio objects 301, 303, because it is closer to the user 300. The position of said audio signal will also be in-front of the user, whereas audio signals from the first and second audio objects 301, 303 will be perceived at their respective off-centre positions.

In some embodiments, gain is the factor with which audio signal amplitude is controlled. We can multiply audio signal samples with a gain coefficient (for example, between 0 and 1), which leads to a change in the signal amplitude. The amplitude change, when implemented by the system, may be performed by multiplying with a certain gain coefficient.

As the user 300 approaches one of the first to third audio objects 301, 303, 305, the amplitudes of the respective audio signals will become louder, so as to be rendered with a degree of realism. Conventionally, a form of audio signal processing, called dynamic range compression (DRC), may be applied to limit the maximum amplitude and therefore the volume that is rendered to the virtual reality headset 220.

Figure 6:
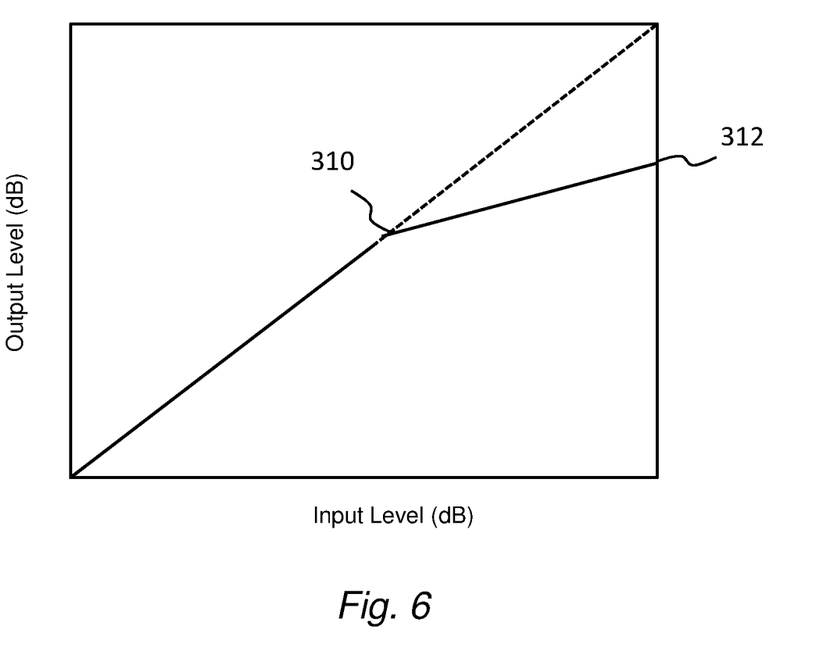
FIG. 6 is a schematic view showing an example operation of a dynamic range compression characteristic, which may be employed in example embodiments.

FIG. 6 shows a typical dynamic range compression characteristic for applying down-compression. As will be seen, as the input level in decibels increases, so does the output level in decibels at a corresponding rate. However, at a threshold point 310, a continued increase in the input level results in a reduced rate of increasing output level, meaning that the amplitude or volume will still increase, but at a lesser rate. The maximum amplitude is indicated at point 312 at which point the output level is prevented from further increase.

Figure 7:
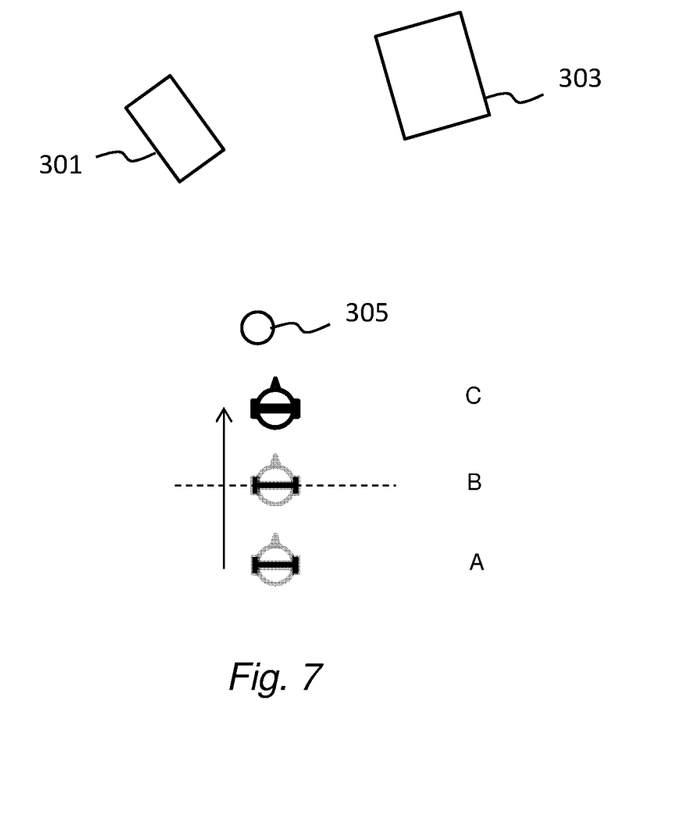
FIG. 7 is a top plan view of an example audio scene comprising a plurality of audio objects, shown in relation to a user carrying a virtual reality headset, the user moving in translation in the audio scene.

FIG. 7 is a view similar to that of FIG. 5. Here, the user 300 is shown during three stages of translational movement from a first position A, to a second position B, and then to a third position C. Position A represents a start position as shown in FIG. 5. The user 300 may then start to explore the virtual world, having heard the first to third audio objects 301, 303, 305 in front of him. The respective volumes of the audio signals for the first to third audio objects 301, 303, 305 may be quite loud at this point, possibly in relation to other objects which are further away and not visible in the Figure. Upon reaching the second position B, the audio signals from the first to third audio objects 301, 303, 305 will grow even louder, possibly with the FIG. 6 dynamic range compression applied and at this point the maximum amplitude is assumed to be reached. Upon the user 300 advancing further to the third position C, the rendered audio signals for the first to third audio objects 301, 303, 305 will remain at the same level despite the advancing movement owing to the fact that the maximum amplitude was reached at position B. In some embodiments, the amplitudes of the first and second objects 301, 303 may be reduced to make the third object 305 sound nearer to the user 300 based on respective positions, but this has drawbacks as mentioned above.

Figure 8:
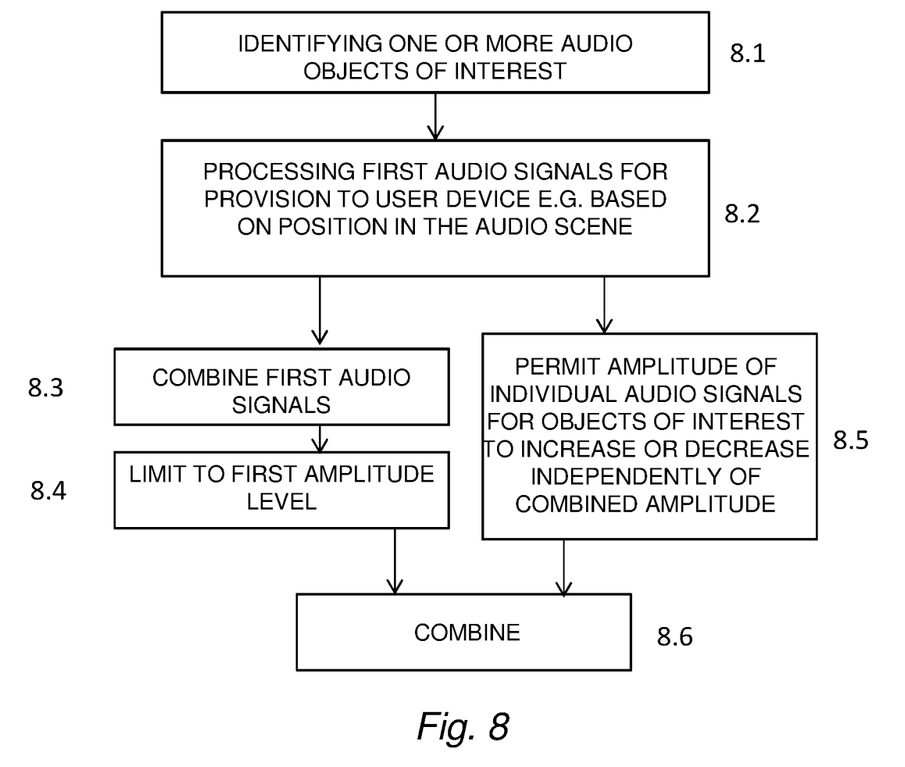
FIG. 8 is a flow diagram showing processing operations that may be performed, in accordance with exemplary embodiments.

Accordingly, in an embodiment, an apparatus and method is provided which operates according to the operations shown in FIG. 8. FIG. 8 may represent processing operations performed in software, hardware or a combination thereof. In the embodiments herein, we assume that the FIG. 8 operations are performed in software by means of a software application 268 shown in FIG. 4.

A first operation 8.1 may comprise identifying one or more audio objects of interest in an audio scene.

Another operation 8.2 may comprise processing first audio signals associated with audio objects for provision to a user device based on the position of the user device in the audio scene. The subsequent steps 8.3-8.5 are example processing operations that may comprise operation 8.2.

Operation 8.3 may comprise combining the first audio signals, which may be all or a subset of the first audio signals. For example, only first audio signals from objects not including the one or more objects of interest may be combined. For example, the first audio signals for the one or more objects of interest may be handled differently than the remainder, for example having their amplitudes or gain adjusted differently or proportions handled differently.

Operation 8.4 may comprise limiting the combined first audio signals from operation 8.3 to a first amplitude level.

Operation 8.5, which may be (but are not necessarily) performed in parallel with operations 8.3 and 8.4 comprises permitting the respective amplitudes for individual audio signals for the objects of interest to increase or decrease independently of the amplitude of the combined first audio signals, for example the limited first amplitude level, used in operation 8.4.

Another operation 8.6 may comprise combining the signals resulting from operations 8.4 and 8.5.

For example, the maximum amplitude or amplitudes for individual audio signal(s) may be modified, e.g. increase up to a second amplitude level which is greater than the first amplitude level, used in operation 8.4. This may not always be the case, however. What is significant is that the individual audio signals are modified or handled differently than the combined audio signals, for example by increasing the gain of an individual audio signal based on decreasing distance between the user 300 and the associated audio object, even though the combined signal is restricted from further increase.

Combining may comprise summing, i.e. adding, in some embodiments.

It should be noted that the operations shown in FIG. 8 are illustrative and certain operations may be re-ordered, performed sequentially instead of in parallel, or vice-versa. In some embodiments, certain operations may be omitted and/or other operations added.

From the above, it will be appreciated that additional headroom, i.e. additional signal modification beyond that to which the combined signals are limited, is permitted to certain audio objects, determined to be objects of interest, in order to permit their respective volume amplitude level(s) to increase regardless of the maximum level applied to other audio objects. This is found to provide improved results, as will be explained.

In order to determine the one or more objects of interest, known methods exist and may be based on one or more of the following examples:

the closest object is the object of interest (distance based);
the closest n objects are the objects of interest, where n>1 (distance based);
one or more objects within a predetermined diameter of the user device are the objects of interest (distance based);
one or more objects within a field of view (FOV) of the user device are objects of interest (gaze based);
one or more objects towards which the user device is moving are objects of interest (position or movement based);
one or more objects with which the user is interacting are objects of interest (interaction based); and
one or more objects belonging to a certain category or categories such as humans (category based).

The present disclosure is not limited to such examples.

Figure 9:
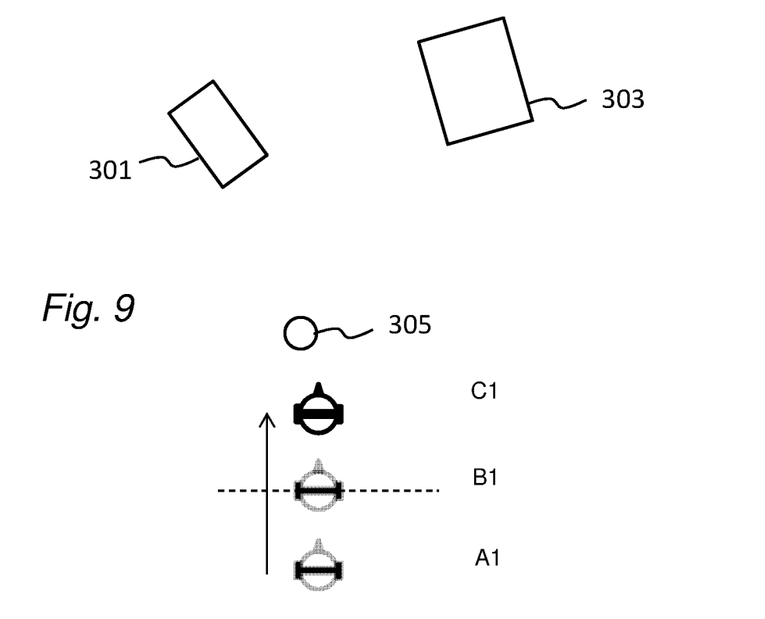
FIG. 9 is a top plan view, similar to FIG. 7, useful for explaining the FIG. 8 processing operations.

FIG. 9 is a view similar to that of FIG. 7. Similar to FIG. 7, the user 300 is shown during three stages of movement from a first position A1, to a second position B1, and then to a third position C1. Position A1 represents a start position as shown in FIG. 5. The user 300 may then start to explore the virtual world, having heard the first to third audio objects 301, 303, 305 in front of him. The respective volumes of the audio signals for the first to third audio objects 301, 303, 305 may be quite loud at this point, possibly in relation to other objects which are further away and not visible in the Figure. Using the FIG. 8 operations, the third object 305 may be determined the only object of interest based on it being the closest to the user device 220.

As such, the audio signals associated, e.g. produced by, the first and second audio objects 301, 303 may be combined. In some embodiments, the audio signal produced by the third object 305 may also be combined with these signals, albeit in lesser proportion. The combined signals are limited to a first amplitude level. The audio signal associated with the third audio object 305 is permitted to be modified independent of how the combined audio signal is modified. For example, the gain of the audio signal associated with the third audio object 305 may increase or decrease; when increasing, the resulting amplitude may even exceed this first amplitude level. If more than one object of interest is identified, each of their respective audio signals may be permitted to change independently, or regardless, of the first amplitude level.

Accordingly, at position B1, the amplitude for the combined audio signal from the first and second audio objects 301, 303 may not increase any further, assuming the first amplitude level is reached. However, the amplitude for the individual audio signal from the third audio object 305 may increase further such that this object of interest appears to the user 300 to be getting louder based on the advancing movement towards it. As the user 300 approaches even closer to the third position C1, the amplitude may increase still further. In some cases, this may increase until the time a second amplitude maximum level is reached.

Accordingly, the user 300 is allowed to perceived changes in volume when moving very close to, or moving farther away from, objects. This is achieved without producing annoying variations in background sound levels, sometimes called the sound bed.

Figure 10:
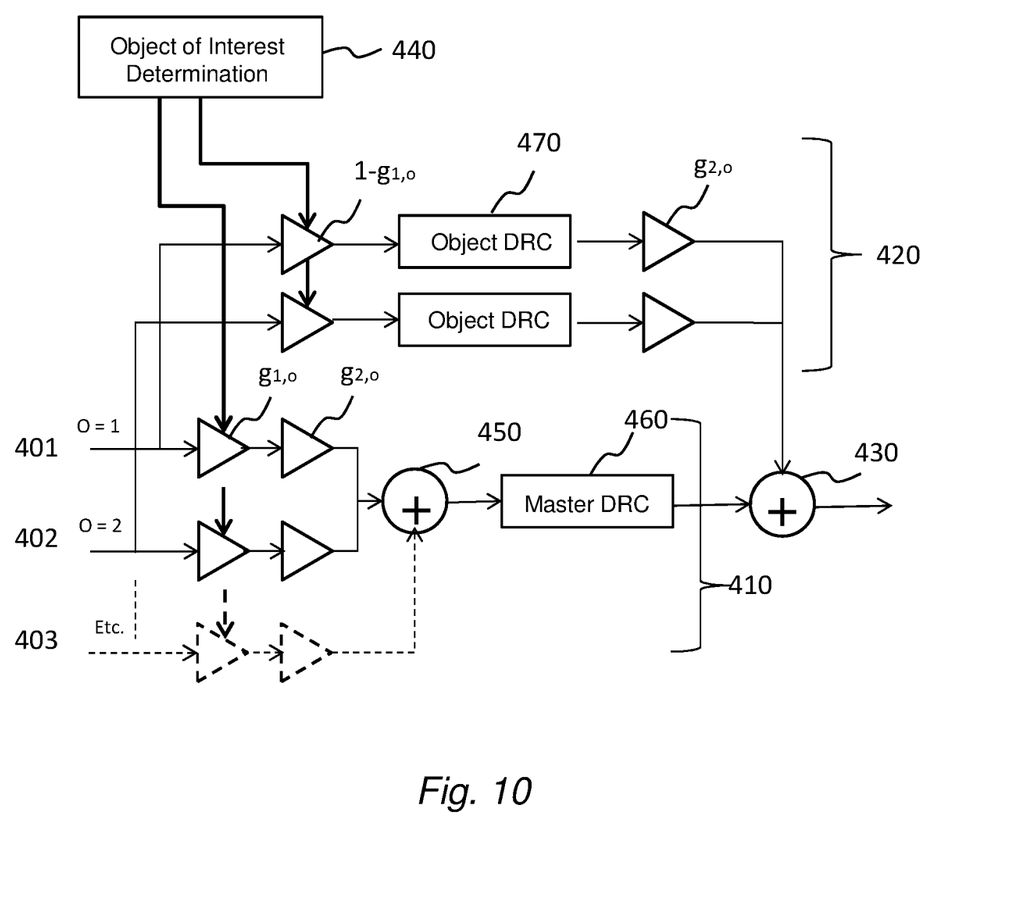
FIG. 10 is a schematic view of a circuit or processor, providing a way to implement the FIG. 8 processing operations.

FIG. 10 is a schematic diagram of an audio processing apparatus 400 for performing the FIG. 8 process according to an example embodiment.

In the audio processing apparatus 400, audio signals from first and second audio objects are applied to respective input nodes 401, 402. A third input node 402 is shown to indicate that further audio signals from a greater number of audio objects may be applied to the audio processing apparatus. Any number of additional audio objects may be catered for.

The audio signals may be in digitised form, as will be appreciated, and therefore references to audio signals are equivalent to audio data.

The audio processing apparatus 400 may be arranged as first and second processing paths 410, 420 as shown. The first, lower processing path 410 is for handling master dynamic range compression on a combined signal. The second, upper processing path 420 is for handling individual dynamic range compression on individual signals from one or more identified objects of interest, received via the input nodes 401, 402 etc.

The processed output signals from the first and second processing paths 420, 430 are combined by a summation module 430 after which the processed audio is provided to, e.g., the headphones of the virtual reality headset 220.

The first processing path 410 comprises a master dynamic range compression module 460 which receives selected and combined audio signals from the input nodes 401, 402 etc. A combiner or summation module 450 is provided for this purpose. The master dynamic range compression module 460 may apply first dynamic range compression along similar lines to the characteristic shown in FIG. 6, with a maximum permitted first level 312. Between the input nodes 401, 402 etc. and the summation module 450 may be provided one or more first amplifiers $g1,o$ for controlling the gain or attenuation of signals received via the input nodes 401, 402 etc. A second amplifier $g2,o$ may be provided subsequent to the first amplifier $g1,o$ for providing a distance rule gain, to be described later on. In both, "o" refers to the object index, e.g. 1, 2, etc.

The second processing path 420 comprises individual second dynamic range compression modules 470 for each signal received via the input nodes 401, 402 etc. Each second dynamic range compression module 470 may apply different, second dynamic range compression than that of the first dynamic range compression module 460. That is not to say that each second dynamic range compression module 470 has the same characteristic; for example, different ones of the second dynamic range compression modules 470 may have different maximum levels.

Between the input nodes 401, 402 etc. and each of the second dynamic range compression modules 470 may be provided an amplifier $1-g1,o$ for controlling the gain or attenuation of signals received via the input nodes 401, 402 etc. prior to applying second dynamic range compression. Between each of the second dynamic range compression modules 470 and the summation module 430 may be provided amplifiers $g2,o$ for controlling the gain or attenuation of signals based on distance rule gain, from the respective second dynamic range compression module 470. The distance rule gain may be determined by the inverse distance of the user device from the one or more audio objects of interest, i.e. so that as the distance decreases, the gain the increases and vice versa.

An object of interest determination module 440 is provided for controlling the gains/attenuations applied to various amplifiers as shown. The purpose is to control the proportion of signals applied to the dynamic range controllers 460, 470 of each of the first and second processing paths 410, 420, which may be a hard selection whereby signals from one or more objects of interest are suppressed from the first processing path, thereby bypassing the master dynamic range compression 460, and conversely only these signals pass into the second processing path and not the other signals from other objects.

In the first processing path 410, each first amplifier in a signal path is termed $g1,o$ and each second amplifier in the same signal path is termed $g2,o$ where o is the object index. It will be appreciated that the first processing path 410 causes summation of the amplified/attenuated signals received at the input nodes 401, 402 to create the channel bed representative of, for example, audio content other than those determined to be of interest.

The purpose of the second dynamic range compression modules 470 is to keep the volume levels of audio signals from the individual objects of interest in check. This is needed because the audio passing through the second processing path 420 does not go through the master dynamic range controller module 460. If that audio has a high volume peak, clipping of the output may occur. The second dynamic range compression is applied before amplification by $g2,o$ so that distance perception is not affected.

To clarify, the object of interest determination module 440 determines one or more objects of interest. For the or each object of interest, e.g. for the first object, the gain for $g1,1$ may be decreased and that of $1-g1,1$ increased simultaneously. This means that object audio will be passed in larger proportion through the second processing path 420 and in lesser proportion through the first processing path 410. The second dynamic range compression module 470 for this first object audio may have a similar compression shape as that of the master dynamic range compression module 460 so that it compresses larger input levels.

As noted above, the gain $g1,o$ may be configured for hard selection of whether to use the first or second processing paths 410, 420 by setting it to 1 (object is not important, so handled with master dynamic range compression module 460) or 0 (object is important, so handled individually with the second dynamic range compression module 470.)

The amplifiers $g2,o$ on the other hand control gain according to a distance rule, e.g. an inverse distance or 1/distance rule. As it is applied after application of the second dynamic range compression module 470 for the signal, its effect can be perceived even if the object is loud. If the object gets loud because of other reasons than the user being close to it, the second dynamic range compression module 470 is applied to suppress its loudness.

When the user moves farther away from the object, the gain $g1,o$ is reduced and the gain $1-g1,o$ increased. This means that the audio object is again passed through normal processing. Cross-fading may be applied so that the gain $g1,o$ is gradually reduced which means that $1-g1,o$ gradually increases, so that the signal smoothly moves to the normal processing path without audible effects.

In some embodiments, different parts of a volumetric audio scene may have different settings for the master dynamic range compression and/or the second dynamic range compression modules 470. For example, some parts of the audio scene may have a strong compression applied and some lower.

In some embodiments, the amount of headroom reserved for objects of interest may depend on the location of the volumetric scene; the object of interest selection logic or identification methodology may different for different parts of the scene. For example, in some parts the closest object may be selected and in other parts the selection may be based using predetermined rules, e.g. identifying particular objects of high importance.

In the above embodiments, modification of the combined first signals and that of the individual first signals may be based on the position of the user device in relation to one or more audio objects. However, in other embodiments, modification may be based on, for example, a change in position by some other interaction means. For example, the user may interact with a touchscreen to change position rather than actually moving within a space.

The examples described herein may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects are set out in the independent claims, other aspects comprise other combinations of features from the described embodiments and/or the dependent claims with the features of the independent claims, and not solely the combinations explicitly set out in the claims. It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one non-transitory memory including computer program code,
the at least one memory and the computer program code configured, with the at least one processor, to cause the apparatus to perform operations comprising:
identifying, from a plurality of audio objects in an audio scene, one or more audio objects of interest; and
processing first audio signals associated with the plurality of audio objects for provision to a user device, wherein processing the first audio signals comprises causing the apparatus to perform:
combining a plurality of the first audio signals to form combined first audio signals, wherein the plurality of the first audio signals are respectively associated with at least some of the plurality of audio objects;
modifying amplitude of the combined first audio signals and limiting to a first level a maximum amplitude of the combined first audio signals; and
modifying amplitude of one or more individual ones of the first audio signals, wherein the one or more individual first audio signals are respectively associated with at least some of the one or more audio objects of interest, said modifying of the amplitude of the one or more individual first audio signals being independent of the modifying of the amplitude of the combined first audio signals.

2. The apparatus of claim 1, wherein the at least one memory and the computer program code are further configured, with the at least one processor, to cause the apparatus to perform
subsequently combining the combined first audio signals, subjected to the first level limiting, with the one or more individual first audio signals and providing a resultant signal to the user device.

3. The apparatus of claim 1, wherein the processing of the first audio signals further comprises:
in a first processing path, applying first dynamic range compression to the combined first audio signals; and
in a second processing path, applying individual second dynamic range compression respectively to the one or more individual first audio signals respectively associated with the at least some of the one or more audio objects of interest.

4. The apparatus of claim 3, wherein the processing of the first audio signals comprises the at least one memory and the computer program code are further configured, with the at least one processor, to cause the apparatus to perform:
amplification in the first processing path to the plurality of the first audio signals prior to combining; and
amplification in the second processing path after respectively applying the individual second dynamic range compression to the one or more individual first audio signals, the amplification being based on a distance of the user device from the one or more audio objects of interest.

5. The apparatus of claim 4, wherein the amplification in the second processing path is determined based on an inverse distance of the user device from the one or more audio objects of interest.

6. The apparatus of claim 3, wherein the one or more audio objects of interest comprises more than one audio object of interest, and wherein the second dynamic range compression, individually applied to respective ones of the one or more individual first audio signals, has different dynamic range compression characteristics for the respective individual first audio signals.

7. The apparatus of claim 3, wherein processing the first audio signals is configured such that a proportion of the one or more individual first audio signals respectively associated with the at least some of the one or more audio objects of interest is:
  decreased prior to combining and applying the first dynamic range compression and
  simultaneously increased prior to applying the individual second dynamic range compression to said one or more individual first audio signals.

8. The apparatus of claim 1, wherein processing the first audio signals is configured such that the combined first audio signals only comprise first audio signals associated with audio objects other than the one or more audio objects of interest.

9. The apparatus of claim 1, wherein the processing of the first audio signals comprises combining the plurality of the first audio signals via summing.

10. The apparatus of claim 1, wherein the one or more audio objects of interest are identified based on distance from the user device.

11. The apparatus of claim 1, wherein the one or more audio objects of interest are identified based on direction of movement of the user device relative to the plurality of audio objects.

12. The apparatus of claim 1, wherein the plurality of audio objects comprise virtual objects in a volumetric virtual scene.

13. The apparatus of claim 12, wherein the one or more individual first audio signals are limited to a second maximum amplitude level, different from the first maximum amplitude level, and the difference between the first and second maximum amplitude levels adjusts dynamically based on a position of the user device in the audio scene.

14. A method comprising:
  identifying, from a plurality of audio objects in an audio scene, one or more audio objects of interest; and
  processing first audio signals associated with the plurality of audio objects for provision to a user device, comprising:
    combining a plurality of the first audio signals to form combined first audio signals, wherein the plurality of the first audio signals are respectively associated with at least some of the plurality of audio objects;
    modifying amplitude of the combined first audio signals and limiting to a first level a maximum amplitude of the combined first audio signals; and
    modifying amplitude of one or more individual one of the first audio signals, wherein the one or more individual first audio signals are respectively associated with at least some of the one or more audio objects of interest, said modifying of the amplitude of the one or more individual first audio signals being independent of the modifying of the amplitude of the combined first audio signals.

15. The method of claim 14, further comprising subsequently combining the combined first audio signals, subjected to the first level limiting, with the one or more individual first audio signals and providing a resultant signal to the user device.

16. The method of claim 14, wherein processing the first audio signals further comprises:
  in a first processing path, applying first dynamic range compression to the combined first audio signals; and
  in a second processing path, applying individual second dynamic range compression respectively to the one or more individual first audio signals respectively associated with the at least some of the one or more audio objects of interest.

17. The method of claim 16, wherein processing the first audio signals further comprises:
  amplifying, in the first processing path, the plurality of the first audio signals prior to combining; and
  amplifying, in the second processing path, after respectively applying the individual second dynamic range compression, the one or more individual first audio signals, wherein the amplifying in the second processing path is based on a distance of the user device from the one or more audio objects of interest.

18. The method of claim 17, wherein the amplifying in the second processing path is determined based on an inverse distance of the user device from the one or more audio objects of interest.

19. The method of claim 16, wherein the one or more audio objects of interest comprises more than one audio object of interest, and wherein the second dynamic range compression, individually applied to respective ones of the one or more individual first audio signals, has different dynamic range compression characteristics for the respective individual first audio signals.

20. A non-transitory computer readable medium comprising computer program code stored thereon, the computer readable medium and computer program code being configured to, when run on at least one processor:
  to identify, from a plurality of audio objects in an audio scene, one or more audio objects of interest; and
  to process first audio signals associated with the plurality of audio objects for provision to a user device, comprising:
    combining a plurality of the first audio signals to form combined first audio signals, wherein the plurality of the first audio signals are respectively associated with at least some of the plurality of audio objects;
    modifying the amplitude of the combined first audio signals and limiting to a first level a maximum amplitude of the combined first audio signals; and
    modifying amplitude of one or more individual ones of the first audio signals, wherein the one or more individual first audio signals are respectively associated with at least some of the one or more audio objects of interest, said modifying of the amplitude of the one or more individual first audio signals being independent of the modifying of the amplitude of the combined first audio signals.

* * * * *